Patented June 4, 1946

UNITED STATES PATENT OFFICE 2,401,608

PROCESS FOR THE NUCLEAR METHYLATION OF PHENOLS

Abraham Burawoy, Levenshulme, Manchester, England, assignor to The Calico Printers' Association Limited, Manchester, England, a British company No Drawing. Application August 18, 1941, Serial No. 407,356. In Great Britain August 17, 1940

4 Claims. (Cl. 260—621)

(Granted under the provisions of sec. 14, act of March 2, 1927; 357 O. G. 5)

This invention relates to the nuclear methylation of phenols.

The present invention affords an expeditious and cheap method of preparing higher homologues of phenols, some of which have not been obtainable hitherto save by complicated and expensive methods of preparation.

The invention consists in a process for the production of monohydroxy phenols containing one or more methyl groups in o- and/or p-position to the phenolic hydroxyl group by heating to a temperature above 250° C. and in alkaline conditions, mononuclear phenolic compounds of the general formula HO—AR(CH$_2$X)$_n$ in which Ar is a benzene or naphthalene radical, X is hydroxyl, or the residue of ammonia or of a primary or secondary amine, or a sulphonic group, or halogen, and $n$ is 1, 2 or 3, the —CH$_2$X group or groups being in o- and/or p-position to the phenolic hydroxyl group, or dinuclear phenolic compounds of the general formula

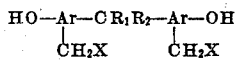

in which Ar is a benzene radical, R$_1$ and R$_2$ are hydrogen or aliphatic substituents, and X is hydroxyl or the residue of ammonia or of a primary or secondary amine or a sulphonic group, or halogen, the groups —CR$_1$R$_2$— and —CH$_2$X being in o- and/or p-position to the phenolic hydroxyl groups.

The amount and nature of the alkaline substances required and added as such to give best results, depends on the method of heating and the starting material, but it is generally found that alkaline materials of a medium strength such as hydroxides and oxides of magnesium, calcium, strontium, and barium, and the borates of the alkali metals are more suitable than weaker alkaline substances such as the acetates, carbonates and phosphates of magnesium, calcium, strontium, barium and of the alkali metals or amines, or stronger alkaline substances such as the hydroxides of the alkali metals.

Instead of heating the phenolic substances used in my process in the presence of an alkaline substance added as such, the isolated alkali or earth alkali metal salts of these phenols, preferably those of magnesium, calcium, strontium and barium can be used.

It is known that the phenolic substances used as starting materials in this process form at moderate temperatures which are generally much lower than those required for the carrying out of the present invention, in the presence of acidic but also alkaline catalysts, highly condensed substances known as phenol-formaldehyde resins containing numerous phenolic groups connected by methylene linkages, the formation of which is detrimental to the yields of methylated phenols in my invention.

The effect of alkaline substances in general, and of those of medium strength especially probably consists in the preservation of conditions least favourable to the formation of such resinous materials. The advantage of using an alkaline substance may be illustrated by the following example:

168 grams of oo'-dimethylol-p-cresol heated alone yielded less than 4 grams of mesitol and a similar amount of 2.4-dimethyl phenol, whereas in the presence of calcium-hydroxide 40 grams of mesitol and 5–10 grams of 2.4-dimethyl-phenol are obtained.

The heating of the aforementioned phenolic substances can be carried out in several known types of apparatus, but conveniently in distilling apparatus. In this case the material is gradually heated up until the phenols begin to distil over, and heating is continued until distillation ceases. The residues of the distillation are resinous substances, the reaction may also be carried out by heating the material in a closed vessel under pressure.

The temperature to which the materials must be heated to give the methylated phenols varies according to the material treated but temperatures exceeding 250° C. are employed.

The substances used as starting materials in my process can be at first isolated, but it is also possible and often advantageous to carry out the process in a single two-phase operation, e. g. by mixing together a phenolic compound, a formaldehyde solution and an alkaline substance, allowing these to react so as to form the required starting material, and then with or without further addition of an alkaline material, heating to the temperature required.

The following examples, in which the proportions of the several materials are given as parts by weight, are given for the purpose of illustration of suitable manners of carrying the invention into effect:

*Example 1.*—90 parts of 37.5% formaldehyde are added with cooling to a mixture of 93 parts of phenol and 93 parts of calcium hydroxide. After a few hours the reaction mixture is distilled. The resultant oil contains mainly ortho-cresol and some paracresol.

*Example 2.*—Equal parts of 2-anilo-methylphenol and of strontium hydroxide are well mixed and distilled. The phenolic part of the resultant oil is separated from aniline by steam distillation in the presence of hydrochloric acid. It consists mainly of ortho-cresol.

*Example 3.*—1200 parts of 37.5% formaldehyde are added under cooling to a mixture of 372 parts of phenol and 372 parts of calcium hydroxide. After a few hours the mixture is distilled. The resultant oil is treated as before and the process repeated if desired. The final distillate is fractionated. The lower boiling fractions consist mainly of mesitol, which can be separated from small amounts of xylenols by steam distillation in the presence of formaldehyde and sodium hydroxide.

*Example 4.*—88 parts of o-monomethylol-p-cresol and 88 parts of calcium hydroxide are well mixed and distilled. The distilled oil is fractionated. The main fraction of boiling point 205–215° C. consists mostly of 2.4 dimethyl-phenol.

*Example 5.*—400 parts of oo'-dimethylol-p-cresol and 400 parts of calcium hydroxide are well mixed and distilled. The oily distillate is fractionated. The fraction 214–222° C. (110 parts) consists of almost pure 2.4.6-trimethyl-phenol (mesitol). Small amounts of 2.4-dimethyl-phenol are also obtained.

*Example 6.*—As Example 5, but the distillation is carried out in the presence of 400 parts of sodium borate instead of calcium hydroxide. A slightly smaller yield of 2.4.6-trimethyl-phenol but an increased yield of 2.4-dimethyl-phenol, is obtained.

*Example 7.*—The calcium salt of oo'-dimethylol-para-cresol is distilled. The resultant oil contains a mixture of some 2.4-dimethyl-phenol and mostly 2.4-trimethyl-phenol.

*Example 8.*—As Example 7 but instead of the calcium salt the magnesium, barium, or strontium salts are used.

*Example 9.*—As Example 7 but instead of the calcium salt the sodium or potassium salts are used. The yield of the methylated phenols is in this case decreased.

*Example 10.*—960 parts of 37.5% formaldehyde are added with cooling to a mixture of 432 parts of paracresol and 432 parts of calcium hydroxide. After a few hours, the reaction mixture is distilled. The distillate is mixed with calcium hydroxide and formaldehyde as above and again distilled. The resultant oil is fractionated or directly steam distilled in the presence of some formaldehyde and alkali, when pure 2.4.6-trimethyl-phenol (160–170 parts) is collected.

*Example 11.*—Equal amounts of 2-piperidinomethyl 4-methyl-phenol and magnesium hydroxide are well mixed and distilled. The resultant oil is washed with dilute hydrochloric acid in order to remove the piperidine and fractionated. It contains mainly 2.4-dimethyl-phenol.

*Example 12.*—90 parts of a 37.5% formaldehyde solution are added with cooling to a mixture of 108 parts of para-cresol and 90 parts of piperidine. After standing for a few hours 110 parts of calcium hydroxide are added, and the mixture is distilled. The resultant oil is washed free from piperidine and fractionated. It contains mainly 2.4-dimethyl-phenol.

*Example 13.*—Equal parts of oo'-dimethylol-p-cresol and calcium hydroxide are heated for 6 hours at 300° C. under pressure. The mixture is steam distilled, when almost pure 2.4.6-trimethyl-phenol is obtained.

*Example 14.*—A mixture of 54 parts of para-cresol 66 parts of sodium sulphite, 44 parts of 37.5% formaldehyde and 600 parts of water are heated on the water bath for 7 hours. 100 parts of calcium hydroxide are added and the mixture distilled. The resultant oil contains mainly 2.4-dimethyl-phenol and a small amount of 2.4.6-trimethyl-phenol.

*Example 15.*—Equal parts of calcium hydroxide and 4-methylol-2-methyl-phenol are distilled. The resultant oil is fractionated. The low boiling fraction (200–220° C.) consists mainly of 2.4- and 2,6-dimethyl phenols.

*Example 16.*—As Example 15, but instead of 4-methylol-2-methyl-phenol, 4-piperidino-methyl-2-methyl-phenol, (m. p. 53° C. prepared from 1 mol. ortho-cresol, 1 mol. piperidine, and 1 mol. aqueous formaldehyde in alcoholic solution) is used. The piperidine is recovered by washing with dilute hydrochloric acid.

*Example 17.*—Equal amounts of 4.4'-dihydroxy-3.3' dimethylol - 5.5' dimethyl-diphenyl-methane and strontium hydroxide are distilled. The resultant oil is fractionated. It contains a mixture of 2.4-dimethyl-phenol, 2.6-dimethyl-phenol and 2.4.6-trimethyl-phenol.

*Example 18.*—960 parts of 37.5% formaldehyde are added with cooling to a mixture consisting of 432 parts of o-cresol and 432 parts of calcium hydroxide. After some hours the reaction mixture is distilled. The resultant oil (266 parts) is again mixed with 266 parts of calcium hydroxide and 250 parts of 37.5% formaldehyde are added with cooling. From the final distillate 102 parts of pure 2.4.6-trimethyl-phenol are isolated.

*Example 19.*—Equal parts of 2-piperidinomethyl-5-methyl-phenol and calcium hydroxide are well mixed and distilled. The resultant oil is washed free from piperidine and fractionated. It contains mostly 2.5-dimethyl-phenol in addition to small amounts of m-cresol.

*Example 20.*—960 parts of 37.5% formaldehyde are added under cooling to a mixture of 432 parts of m-cresol and 432 parts of calcium hydroxide. After a few hours the reaction mixture is distilled and the process is repeated once or twice with the resultant oil. 128 parts of pure 2.3.4.6-tetramethyl-phenol are isolated in known manner in addition to a small amount of 3.4.6-trimethyl-phenol.

*Example 21.*—Equal parts of 2-piperidinomethyl-3.5-dimethyl-phenol and calcium oxide are distilled. After removal of piperidine, the resultant oil is fractionated. It contains mainly 2.3.5-trimethyl-phenol.

*Example 22.*—720 parts of 37.5% formaldehyde are added to a mixture of 488 parts of 3.5-dimethyl-phenol and 488 parts of calcium hydroxide with cooling. After a few hours the reaction mixture is distilled. The resultant oil (264 parts) consists of a mixture of about equal amounts of 2.3.5-trimethyl-phenol and 2.3.5.6-tetramethyl-phenol. If desired it is again mixed with 200 parts of calcium hydroxide, about 150 parts of 37.5% formaldehyde are added with cooling, and after a few hours the reaction mixture is again distilled. The resultant oil which quickly solidifies contains a mixture of 184 parts of pure 2.3.5.6-tetramethyl-phenol, and some 50–60 parts of 2.3.5-trimethyl-phenol, which can be separated in known manner.

*Example 23.*—Equal parts of 2-piperidinomethyl-1-naphthol and magnesium oxide are distilled. The distillate contains a small yield of 2-methyl-1-naphthol.

*Example 24.*—Equal parts of 1-piperidinomethyl-2-naphthol and calcium hydroxide are distilled. After removal of the piperidine the resultant oil contains a moderate yield of 1-methyl-2-naphthol together with some β-naphthol which is separated in known manner.

*Example 25.*—A mixture of equal amounts of 1—$CH_2SO_3H$—2—naphthol and calcium hydroxide is distilled. The resultant oil contains 1-methyl-2-naphthol together with some β-naphthol which is separated in known manner.

*Exampe 26.*—100 parts of 2'.6'-dichloro 2.4.6-trimethyl-phenol (prepared according to British Patent 347,887) and 150 parts of calcium hydroxide are well mixed and distilled. The resultant oil contains mainly 2.4.6-trimethyl-phenol, and some 2.4-dimethyl-phenol.

*Example 27.*—960 parts of 37.5% formaldehyde are added with cooling to a mixture of 432 parts of a commercial cresylic acid and 432 parts of calcium hydroxide. After a few hours the reaction mixture is distilled. The resultant oil is again treated in the above manner, and the process is repeated a third time. In order to remove any incompletely methylated phenols, the final distillate is treated with some formaldehyde and alkali and steam distilled, when a mixture of pure 2.4.6-trimethyl-phenol and 2.3.4.6-tetramethyl-phenol (130 parts) are collected which can be separated by fractionation.

What I claim is:

1. A process for the production of monohydric phenols having methyl groups in positions other than the m-position with respect to the phenolic hydroxyl group, comprising dry distilling at a temperature above 250° C. and in the presence of an alkali selected from a group consisting of the alkaline earth metal oxides and hydroxides, phenolic aryl compounds having from 1 to 3 groups of the type —$CH_2X$, wherein X is selected from a group consisting of hydroxyl and groups capable of being converted to hydroxyl under the conditions of the reaction, in positions other than the m-position with respect to phenolic hydroxyl group.

2. A process for the production of monohydric phenols having methyl groups in positions other than the m-position with respect to the phenolic hydroxyl group, comprising dry distilling at a temperature above 250° C. and in the presence of an inorganic alkali selected from a group consisting of the alkaline earth metal oxides and hydroxides, phenolic aryl compounds having from 1 to 3 methylol groups in positions other than the m-position with respect to the phenolic hydroxyl group.

3. The process of claim 1 wherein the phenolic aryl compound is one selected from a group consisting of phenols and methyl-substituted phenols and naphthols.

4. The process of claim 2 wherein the phenolic aryl compound is one selected from a group consisting of phenols and methyl-substituted phenols and naphthols.

ABRAHAM BURAWOY.